Oct. 25, 1927.  
S. W. BARNETT  
CORN PICKING AND HUSKING MACHINE  
Filed Jan. 7, 1925  
1,646,741  
3 Sheets-Sheet 1
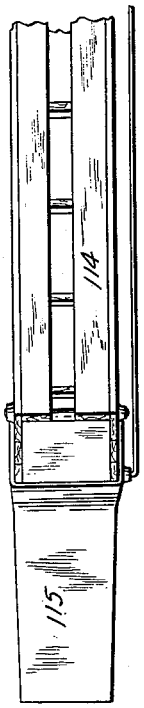
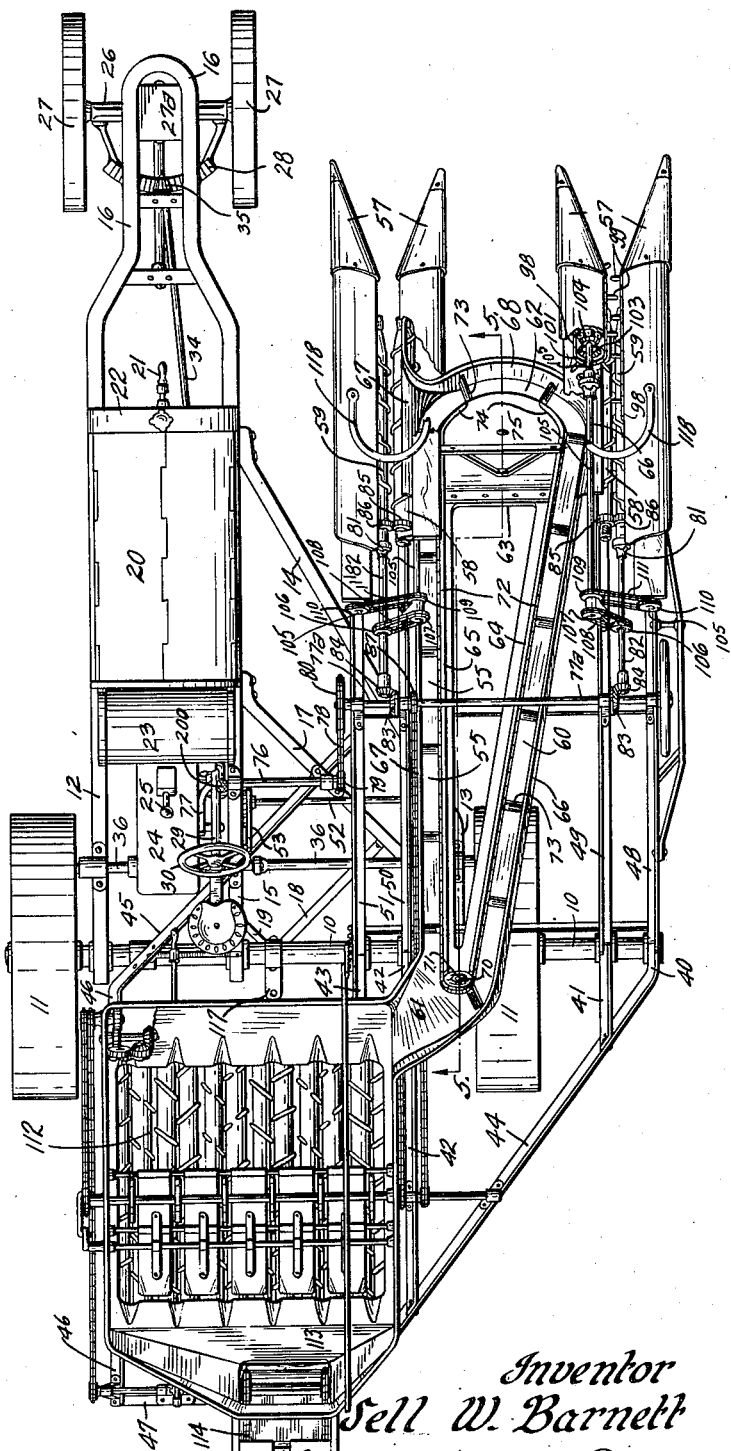

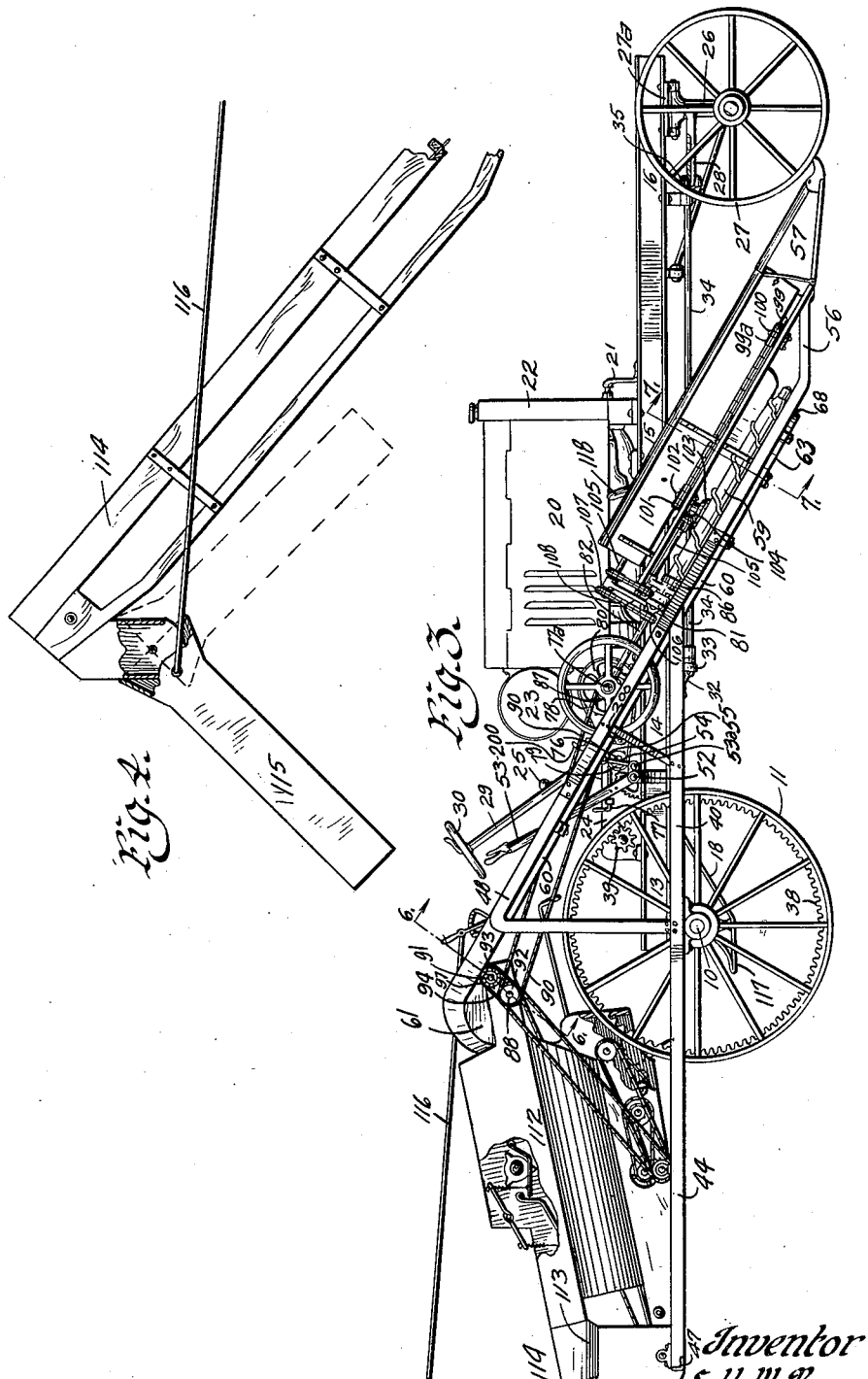

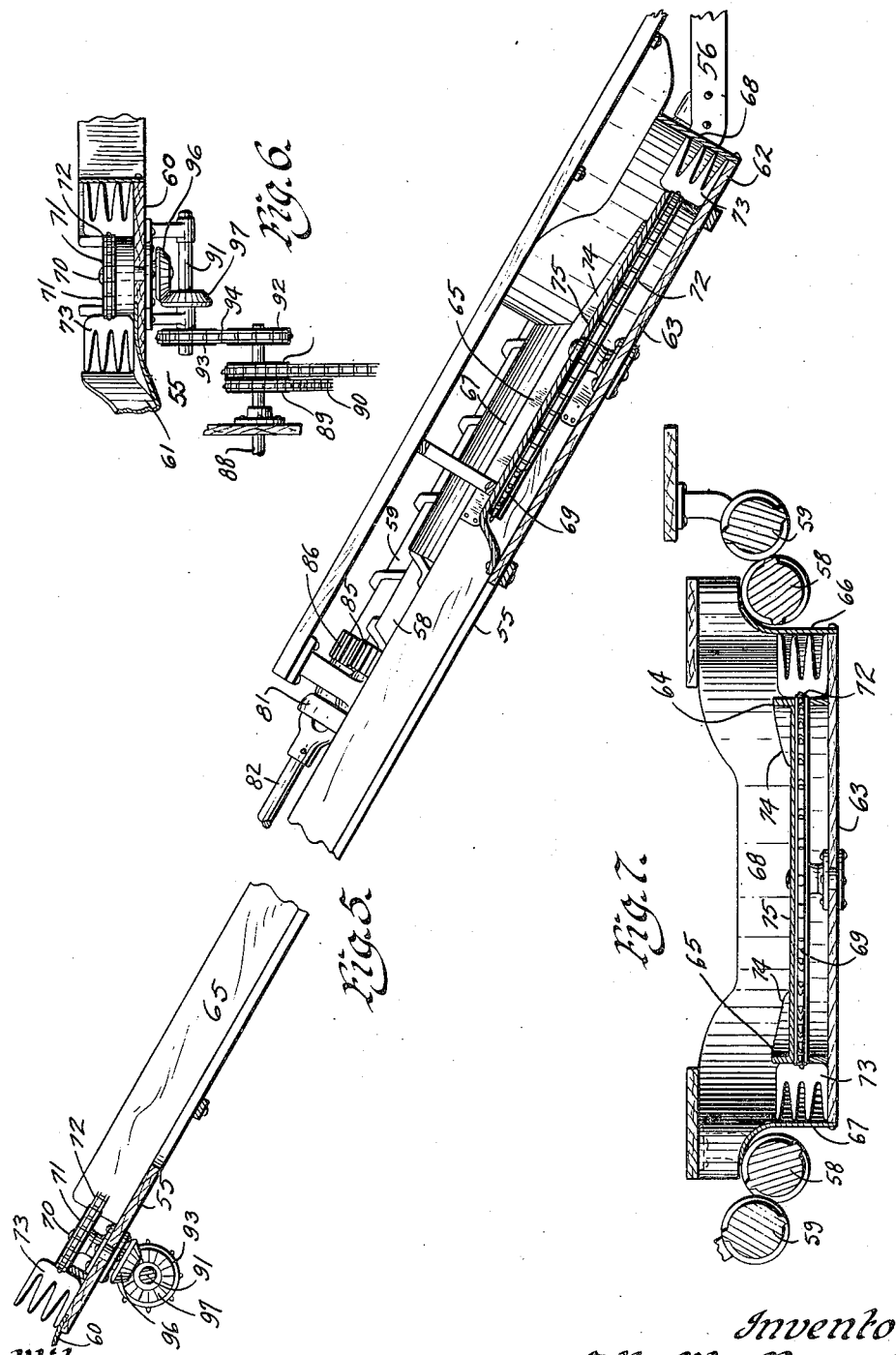

Patented Oct. 25, 1927.

1,646,741

UNITED STATES PATENT OFFICE.

SELL W. BARNETT, OF WEBSTER CITY, IOWA.

CORN PICKING AND HUSKING MACHINE.

Application filed January 7, 1925. Serial No. 1,119.

My invention relates to that class of machines which are employed for picking and husking corn from the stalks in the field.

It is the purpose of my invention to provide a machine of the general type mentioned having various advantageous features of construction and operation which will hereinafter more fully appear.

More particularly, it is my purpose to provide in such a machine, mechanism for picking the ears from the stalks and conveying them to husking rollers, which mechanism is of novel construction adapted to pick two rows of corn at a time.

A further object is to provide in such a machine means for properly balancing and tilting the corn handling mechanism.

A further object is to provide such a machine of the power driven type to which a wagon may be hitched in such manner that the corn may be conveniently delivered thereto during the harvesting operation of the machine.

With these and other objects in view, my invention consists in the construction, arrangement and combination of the various parts of my corn picking machine, whereby the objects contemplated are attained, as hereinafter more fully set forth, pointed out in my claims, and illustrated in the accompanying drawings, in which:

Figure 1 shows a top or plan view of a corn picking machine embodying my invention.

Figure 2 is a fragmentary plan view of the corn elevator and swinging discharge spout or chute.

Figure 3 is a side elevation of my corn picking machine.

Figure 4 is a side elevation of part of the elevator and spout, parts being broken away and parts being shown in section.

Figure 5 is a detailed, sectional view taken on the line 5—5 of Figure 1, parts being broken away and other parts omitted.

Figure 6 is a detailed, sectional view taken on line 6—6 of Figure 3; and

Figure 7 is a detailed, sectional view taken on the line 7—7 of Figure 3.

In the drawings herewith, I have used the reference numeral 10 to indicate the main supporting axle of my corn picking machine. Rotatably mounted on the axle are wheels 11, which are spaced apart such a distance as the machine may travel in the field with two rows of corn between said wheels.

The axle 10 projects beyond the righthand wheel 11 a substantial distance as shown in Figure 1.

The main frame of the machine consists of a left-hand member 12 supported on the axle 10 and projected forwardly therefrom from a point near the left-hand wheel 11, as shown in Figure 1. A main frame member 13 is supported on the axle 10 just inside the right-hand wheel 11 and extends forwardly and is thence inclined forwardly and toward the left as at 14 (see Figure 1).

Between the members 12 and 13, a main frame member 15 is supported on the axle 10 and extends forwardly parallel with the member 12. The forward ends of the members 12 and 15 are connected by a U-shaped member or portion 16.

A brace member 17 connects the frame members 15 and 13 and additional bracing frame members 18 and 19 may be provided.

On the main frame is supported a motor 20 having a starting crank 21, a radiator 22, a fuel tank 23, a transmission gear box 24 with a suitable transmission structure therein and a gear shifting lever 25.

At the front of the main frame, a suitable axle 26 has the supporting wheels 27 mounted thereon. The axle 26 is pivotally connected with a block 27ª supported between the arms of the frame portion 16.

Connected with the axle 26 is a curved rack bar or sector 28. On the main frame is supported a steering post 29 on which is a steering wheel 30 (see Figure 1).

At its lower end, the steering wheel 30 has a steering rod 32 extending through the steering post 29 and connected at its lower end by a universal joint 33 (see Figure 3) with a forwardly extending rod 34 having at its forward end a beveled pinion 35 arranged to mesh with the segmental rack 28 above mentioned.

Supported on the main frame is a transverse shaft 36 which extends through the gear box 24 and is operatively connected with the gears therein in any suitable way.

The wheels 11 are provided with internal gears 38 which mesh with pinions 39 on the ends of the transverse shaft 36 (see Figures 1 and 2).

The traction mechanism of the device forms no part of my present invention and is illustrated only in a general way for the purpose of showing the environment of the invention.

Pivotally supported on the axle 10 is an auxiliary frame including the horizontal frame members 40, 41, 42 and 43. The frame member 44 extends from the rear end of the member 40 rearwardly to the end of the machine. The frame member 45 is extended from the forward portion of the frame member 43 rearwardly and to the left end is pivoted on the main frame and terminates in a portion 46 extending rearwardly as shown in Figure 1.

The rear ends of the frame members 44 and 46 are connected by a transverse frame member 47. The gathering and picking arms are supported on the auxiliary frame by means of addtional frame members 48, 49, 50 and 51.

The auxiliary frame is tiltable and is tilted by the following means: Supported on the main frame is a transverse shaft 52. A lever 53 (see Figure 3) is connected to the shaft 52. At the other end of the shaft 52 is an arm 53$^a$ fixed thereto. A link 54 is pivoted to the arm 53$^a$ and to the underside of the conveyor trough 55 hereinafter more fully referred to.

The lower ends of the members 48, 49, 50 and 51 are extended horizontally forwardly as at 56 (see Figure 3).

Supported on the auxiliary frame are the gathering arms 57, which are of any well known structure suitable for the purpose. There are two pairs of gathering arms so arranged that the machine can be used for picking two rows of corn at once.

Rearwardly of each pair of gathering arms is a pair of picking rolls, the rollers of each pair being indicated by the numerals 58 and 59.

Between the picking rolls is a conveyor structure, comprising the conveyor trough 55, already mentioned, extending from position alongside the inner pair of picking rolls upwardly and rearwardly, and the conveyor trough 60 extending from position alongside the outer pair of picking rolls rearwardly and upwardly and inwardly.

The conveyor troughs 55 and 60 at their rear ends communicate with an inwardly and downwardly inclined chute 61, shown in Figures 1 and 3. At their lower ends, the conveyor troughs 55 and 60 are connected by a curved connecting trough 62.

The rolls 58 of the respective pairs are the rolls nearest to the adjacent conveyor troughs 55 and 60 and are arranged a little below the picking rolls 59, as illustrated in the Figure 7.

The troughs 55, 60 and 62 at their lower ends have a common bottom 63, shown in Figure 5.

The trough 60 has an inner wall 64 and the trough 55 has an inner wall 65. The trough 60 has an outer wall 66 and the trough 55 has an outer wall 67. The walls 66 and 67 are curved upwardly and over the rolls 58, as shown in Figure 7.

It will be seen that as the ears are snapped from the stalk the relative arrangement of the rolls 58 and 59, as illustrated in Figure 7, and the arrangement of the troughs 55 and 60 adjacent thereto will cause the ears to drop over into the troughs 55 and 60. The trough 62 has a lower or forward wall 68 (see Figures 1 and 7). Located above the common bottom 63 at the lower end of the conveyor troughs 55 and 60 is a rotatably mounted sprocket 69 shown in Figure 7.

At the junction of the conveyor trough 55 and 60 at their upper ends is a shaft 70 on which is a sprocket 71 (see Figure 5). A conveyor chain 72 travels on the sprockets 71 and 69 and adjacent to the inner wall of the conveyor trough 55 and the inner wall of the conveyor trough 60.

On the chain 72 are projecting fingers 73 which convey the corn from the inner rolls across through the trough 62 to the trough 60 and then convey the corn from both rolls upwardly and rearwardly in the trough 60 to the chute 61.

The walls 64 and 65 are inclined inwardly as at 74 at their lower ends and the trough 62 has no upper wall. A cover plate 75 is provided for the sprocket 69, so that if any ears of corn drop over the walls 64 and 65, shown in Figure 7, upon the cover plate 75, they may slide downwardly into the trough 62.

For operating the picking rolls and the conveyor chain 72, the following means are provided: Connected with the gears in the gear box 24 is a shaft 76 (see Figure 1), which is controlled by a clutch lever 77.

Supported on the frame members 48, 49, 50 and 51 is a transverse drive shaft 77$^a$. Power is transmitted from the shaft 76 to the shaft 77$^a$ by means of a chain 78 and sprockets 79 and 80. The shaft 77$^a$ is so located that the chain 78 will have play enough to permit the necessary tilting of the auxiliary frame.

The picking rolls 59 are connected by universal joints 81 with suitable mounted shafts 82. On the shafts 77$^a$ are beveled gears 83 meshing with beveled gears 84 on the shafts 82. Each picking roll 58 is rotated from its coacting picking roll 59 by means of the pinions 85 and 86 shown for instance in Figure 1.

On the shaft 77$^a$ is a sprocket 87 shown in Figure 1. Supported suitably on the auxiliary frame below the upper ends of the troughs 55 and 60 is a shaft 88 shown in Figure 6. On the shaft 88 is a sprocket 89. A chain 90 travels on the sprockets 89 and 87 for transmitting motion from the shaft 77$^a$ to the shaft 88.

Mounted below the upper ends of the troughs 55 and 60 is another stub shaft 91.

(See Figure 6.) On the shaft 88 is a sprocket 92 aligned with a sprocket 93 on the shaft 91. A chain 94 travels on the sprockets 92 and 93.

Suitably mounted at the upper ends of the troughs 55 and 60 is a shaft 70 on which is the sprocket 71, hereinbefore referred to.

On the shaft 70 is a beveled gear 96 meshing with a beveled gear 97 on the shaft 91.

Each of the gathering arms has supported thereon a chain 98 carrying fingers 99 which are of ordinary construction and form no part of the present invention. Each chain 98 at its lower end travels around a sprocket 99ᵃ on a stub shaft 100. Each chain 98 at its upper end travels on a sprocket 101 on a shaft 102.

On each shaft 102 is a beveled gear 103. Each beveled gear 103 meshes with a beveled gear 104 on the shaft 105. For rotating the shafts 115, I provide the following means:

On each shaft 82 is a sprocket 106 in line with a sprocket 107 on one of the shafts 105, as shown in Figure 1. A chain 108 travels on the sprockets 106 and 107. On the shaft 105 having the sprocket 107 is a sprocket 109 aligned with a sprocket 110 on the shaft 105 of the adjacent picking arm.

A chain 111 travels on the sprockets 109 and 110.

It will thus be seen that the shafts 105 are operated from the shafts 82 through the media of the sprockets 106 and 107, the chains 108, the sprockets 109 and 110 and the chain 111.

The chute 61 discharges into a husking mechanism 112, which will not be described in detail and may be of any suitable standard type. The husking mechanism has means for removing the husks from the ears and means for discharging the husks not here further described.

Below the husking mechanism is a trough or chute 113 shown in Figure 1, from which a suitable conveyor 114 extends upwardly and rearwardly and discharges into a swinging chute or spout 115 operated by means of a rod 116 (see Figure 4) and adapted to discharge into a wagon.

A wagon may be connected to the hitch 117 shown in Figure 3 and drawn behind the corn picking machine. The mechanism for operating the husking rolls and the conveyor 115 is not here particularly described nor is it largely shown in the drawings.

In the operation of the machine, it will be understood that the engine is used for advancing the machine.

The stalks of corn are gathered between the arms 57 of each pair. The arches 118 help to rigidly connect the gatherers. The snapping rolls pull the ears from the stalks and they are dropped over the lower rolls 58 and the upper parts of the walls 66 and 67 into the conveyors 55 and 60, where they are gathered by the fingers 73 around the conveyor 62 from the conveyor 55 and up the conveyor 60 the chute 61, whence they are discharged laterally to the husking rolls. Any ears that happen to drop over the walls 64 and 65 will slide downwardly between the ends of the walls 74 and 75 into the conveyor 62.

The operations after the corn leaves the chute 61 are standard operations, which will not be here more fully described.

There are a number of important advantages accomplished by the employment of the features of construction hereinbefore described.

It will be noted that I have provided a two row corn picker, which is operated under its own power. It will be seen that the engine is located well toward the left in the machine, so as to impose the greater part of the weight of its rear part on the left hand wheel 11.

At the same time, the auxiliary frame which supports both the picker arms and the husking rolls is supported on the axle 10 and on the wheels 11 with the picking arms arranged at one side of the engine, so that their weight will be imposed largely on the right-hand wheel 11. However, the same auxiliary frame supports the picker arms and the snapping rolls and the husking rolls.

It will be noted that the husking rolls are located to the left of the center of the machine, so that they thus serve to balance the picking arms and picking rolls on the axle 10.

The load is thus balanced on the two wheels 11, being distributed properly laterally on the machine, and also by mounting the auxiliary frame over the axle, as is here shown, it will be seen that the load is balanced from front to rear on the axle 10, part of the load being distributed behind the axle and part of the load in front of the axle. These are important features in the mechanical design of the machine.

It will also be noted that I have used a single conveyor for the corn snapped by both pairs of snapping rolls. This conveyor receives the corn from one pair of picking rolls while the conveyor chain is on its downward way, and takes it around the bottom of the boot then upward, receiving the corn from the other pair of rolls on its upward way, discharging it at its upper end laterally. This is a novel and essential feature. This does away with the necessity of using a separate conveyor for each pair of snapping rolls.

An important feature of the invention is also found in the arrangement of the chute 61, which is arranged to discharge laterally and downwardly to the husking rolls.

It will be noted also that the endless conveyor, which carries the ears from the snapping rolls rearwardly is inclined at its point of discharge so as to throw the ears to the left in the machine for delivering them to the husking rolls.

This is an important feature of construction in view of the fact that the picking rolls are located to the right of the longitudinal center of the machine, while the husking rolls are located to the left of the longitudinal center of the machine.

It will be noted that in the construction here shown, the wagon can be hitched to the member 117, as hereinbefore mentioned. As a result in commencing a land, there is left only one down row. With a corn picker picking only one row and using a lateral elevator with a wagon, there are about four down rows at the beginning of the land.

Of course, in a structure of this kind, there is gained the advantage of picking two rows of corn at a time and with the modern means for controlling the engine and the corn picker from the wagon, one man can handle an entire machine.

It will thus be seen that I have provided a properly balanced two-row picker by arranging the gathering arms and snapping rolls at one side of the longitudinal center of the machine and arranging the engine and the husking rolls at the other side of the longitudinal center, and have also balanced the machine from front to rear.

In such a machine, I have provided a picker, and conveyor for the ears snapped from the stalks, whereby the ears are carried rearwardly and discharged laterally to the husking rolls, thus accommodating the conveyor mechanism to a machine in which the husking rolls are located laterally with relation to the picking rolls.

This machine embodies in one unit the picking and husking mechanisms, the power plant and traction means for advancing the machine and pulling a wagon.

There is eliminated the necessity for a separate tractor or team to pull the machine and the necessity for means to pull the wagon. One man can handle the machine and the wagon.

By arranging the steering wheels alongside the gathering means, the latter are more easily and accurately controlled than would otherwise be possible.

It will be noted that clutches 200 and 77 are provided for the traction means and the mechanism of the machine. Since all corn harvesters sometimes clog, it is thus possible to operate the picking and husking mechanisms without advancing the whole machine to thus clear the mechanisms.

I claim as my invention:

1. In a corn picking machine, a wheel supported frame, spaced sets of corn picking mechanism thereon, a single endless conveyor arranged in an inclined trough between the mechanisms for conveying the corn picked by both sets, having sprocket wheels, the axes of the sprocket wheels of said conveyor being substantially vertical to the bottom of said inclined trough, whereby corn is received from one corn picking mechanism and is carried to the other one where the conveyor receives the corn therefrom.

2. In a corn picking machine, a wheel supported frame, spaced sets of corn picking mechanisms thereon, a single endless conveyor arranged between the mechanisms for conveying the corn picked by both sets, comprising troughs converging at their upper ends and having a connecting trough at their lower ends, conveyor means traveling in the troughs.

3. In a corn picking machine, a frame mounted on wheels, spaced corn picking mechanisms thereon, a conveyor having a rotary member at its upper rear end, a rotary member at its lower end between said mechanisms, a flexible element, fingers on said element, a trough in which the element travels past the mechanisms and to the upper rotary member, the axes of said rotary members being substantially vertical to the bottom of said trough, a laterally inclined chute to receive corn discharged from the open upper end of the trough, and means for advancing the flexible element in a direction such that the movement of the fingers on the flexible element around the upper sprocket tends to throw the corn into the chute in the direction of the inclination of the chute from the trough.

4. In a corn picking machine, a wheel mounted axle, a main frame thereon having steerable supporting means at its front end, a power device on the main frame, an auxiliary frame, pivoted on the axle, a corn picking mechanism on the auxiliary frame forwardly of the axle and at one side of the longitudinal center of the machine, and a corn husking mechanism on the auxiliary frame at the other side of the longitudinal center and rearwardly of the axle.

Des Moines, Iowa, December 19, 1924.

SELL W. BARNETT.